(12) United States Patent
Mazumder

(10) Patent No.: US 9,553,314 B2
(45) Date of Patent: Jan. 24, 2017

(54) PULSED LASER CHEMICAL VAPOR DEPOSITION AND SURFACE MODIFICATION

(71) Applicant: The Regents of The University of Michigan, Ann Arbor, MI (US)

(72) Inventor: Jyotirmoy Mazumder, Ann Arbor, MI (US)

(73) Assignee: The Regents of the University of Michigan, Ann Arbor, MI (US)

(*) Notice: Subject to any disclaimer, the term of this patent is extended or adjusted under 35 U.S.C. 154(b) by 51 days.

(21) Appl. No.: 14/251,928

(22) Filed: Apr. 14, 2014

(65) Prior Publication Data

US 2014/0308587 A1    Oct. 16, 2014

Related U.S. Application Data

(60) Provisional application No. 61/811,492, filed on Apr. 12, 2013.

(51) Int. Cl.
*H01M 4/78* (2006.01)
*H01M 4/04* (2006.01)
*H01M 4/1395* (2010.01)
*H01M 4/139* (2010.01)
*H01M 4/66* (2006.01)
(Continued)

(52) U.S. Cl.
CPC ............. *H01M 4/78* (2013.01); *H01M 4/0428* (2013.01); *H01M 4/0471* (2013.01); *H01M 4/139* (2013.01); *H01M 4/661* (2013.01); *H01M 10/052* (2013.01); *H01M 4/1391* (2013.01);
(Continued)

(58) Field of Classification Search
CPC .................... H01M 10/052; H01M 2004/025; H01M 4/0428; H01M 4/0471; H01M 4/139; H01M 4/1391; H01M 4/661; H01M 4/78; Y02E 60/122; Y02P 70/54
See application file for complete search history.

(56) References Cited

U.S. PATENT DOCUMENTS 8,279,579 B1 * 10/2012 Rivas Alvarez ... B23K 26/0078
361/502
2008/0131782 A1 * 6/2008 Hagiwara ............. C01G 51/42
429/231.95
(Continued)

OTHER PUBLICATIONS

S. Bhattacharya, D. H. Kam, L. Song, J. Mazumder. Characterization of Individual Microneedles Formed on Alloy Surfaces by Femtosecond Laser Ablation, Metallurgical and Materials Transactions A, vol. 43A, Aug. 2012, 2574-2580.*

*Primary Examiner* — Carlos Barcena
(74) *Attorney, Agent, or Firm* — Reising Ethington P.C.

(57) ABSTRACT

An ultra-short pulse laser physically and/or chemically modifies a substrate surface. A laser ablation process is configured to form raised surface features on the substrate. The laser also functions as the energy source in a chemical vapor deposition (CVD) process. The laser delivers energy to the substrate with parameters such as pulse energy, size, duration, and spacing sufficient to simultaneously vaporize substrate material and cause the substrate material to react with a controlled environment that includes constituents of a desired coating composition. A battery electrode having a face with microneedle features coated with an active metal compound can be produced by the process. The active metal compound is a lithium-containing compound in a lithium-ion battery.

20 Claims, 4 Drawing Sheets

(51) Int. Cl.
*H01M 10/052* (2010.01)
*H01M 4/02* (2006.01)
*H01M 4/1391* (2010.01)

(52) U.S. Cl.
CPC ....... *H01M 2004/025* (2013.01); *Y02E 60/122* (2013.01); *Y02P 70/54* (2015.11)

(56) References Cited

U.S. PATENT DOCUMENTS

2010/0035152 A1* 2/2010 Sastry .................... B82Y 30/00
429/218.1
2011/0111296 A1* 5/2011 Berdichevsky ..... H01M 4/0428
429/218.1

* cited by examiner

PULSED LASER CHEMICAL VAPOR DEPOSITION AND SURFACE MODIFICATION

CROSS-REFERENCE TO RELATED APPLICATION

This application claims the benefit of U.S. Provisional Application Ser. No. 61/811,492 filed on Apr. 12, 2013, the entire contents of which are hereby incorporated by reference.

TECHNICAL FIELD

The present disclosure relates generally to modifying material surfaces with laser energy.

BACKGROUND

Short pulse laser ablation processes have been investigated and/or used in a variety of applications, such as material removal processes where it is desired to remove very thin layers of materials or coatings. Nanosecond, picosecond, and femtosecond lasers combine the advantages of the high-density energy delivery capability of laser light with a reduced heat-affected zone, making them useful for processing temperature sensitive or otherwise delicate materials with a high degree of precision and/or for localized material surface treatments.

SUMMARY

In accordance with one or more embodiments, an electrochemical cell includes a first electrode having a first face and a second electrode having a second face that opposes the first face. The second electrode includes microneedles at the second face that extend toward the first electrode. The electrochemical cell also includes an electrolyte between the opposing first and second faces of the electrodes.

In accordance with one or more embodiments, a method of making an electrode for use in an electrochemical cell includes the steps of: (a) providing an electrode substrate formed from a substrate material; (b) forming raised surface features comprising the substrate material on the electrode substrate using a pulsed laser having a pulse energy and duration sufficient to form the raised surface features; and (c) depositing a metal compound along the raised surface features. The metal compound is selected to be an active metal compound that changes in amount during charge and discharge cycles when in use in the electrochemical cell.

In accordance with one or more embodiments, a method includes laser ablation and laser chemical vapor deposition, wherein the same laser simultaneously ablates substrate material at a substrate surface and sufficiently heats the substrate material to react with one or more gaseous substances in a controlled environment to form a solid reaction product that is deposited over the substrate.

DESCRIPTION OF THE DRAWINGS

One or more embodiments will hereinafter be described in conjunction with the appended drawings, wherein like designations denote like elements, and wherein.

DETAILED DESCRIPTION OF EMBODIMENT(S)

Described herein is a process that employs a pulsed laser to physically and/or chemically modify a substrate surface. In one aspect, the process is a laser ablation process configured to form raised surface features on the substrate. In another aspect, the process is a laser chemical vapor deposition (CVD) process. The process may also be considered a combined laser ablation and CVD process with a laser delivering energy to the substrate with parameters such as pulse energy, size, duration, and spacing sufficient to simultaneously vaporize substrate material and cause the substrate material to react with a controlled environment that includes constituents of a desired coating composition.

The process is described below in the context of a method of making an electrode for use in an electrochemical cell, such as a lithium-ion (Li-ion) battery. Electrodes so produced can impart the electrochemical cell with higher energy density due to the increased surface area provided by the ablation process. Where the active electrode material is provided by CVD, it is chemically bonded to the underlying substrate with a uniform thickness uncharacteristic of some other coating processes, such as slurry coating processes that are sometimes used in Li-ion battery electrode manufacturing. Slurry-coated electrodes sometimes result in a considerable amount of loose particles along the face of the electrode, which can promote dendrite growth toward the oppositely charged electrode or migrate within the electrochemical cell, increasing the risk of short-circuit and/or fire hazard, at least in Li-ion batteries. Moreover, with laser ablation and CVD as a combined process, physical surface modification and coating are provided in a single process, thus providing multiple benefits, such as reduced cost and cycle time. The method is not limited to Li-ion batteries, nor is it limited to batteries or other electrochemical cells. Many other types of products may benefit from the ability to physically and/or chemically modify a substrate surface, such as membranes, catalyst structures, and fuel cell plates, to name a few.

Figure 1:
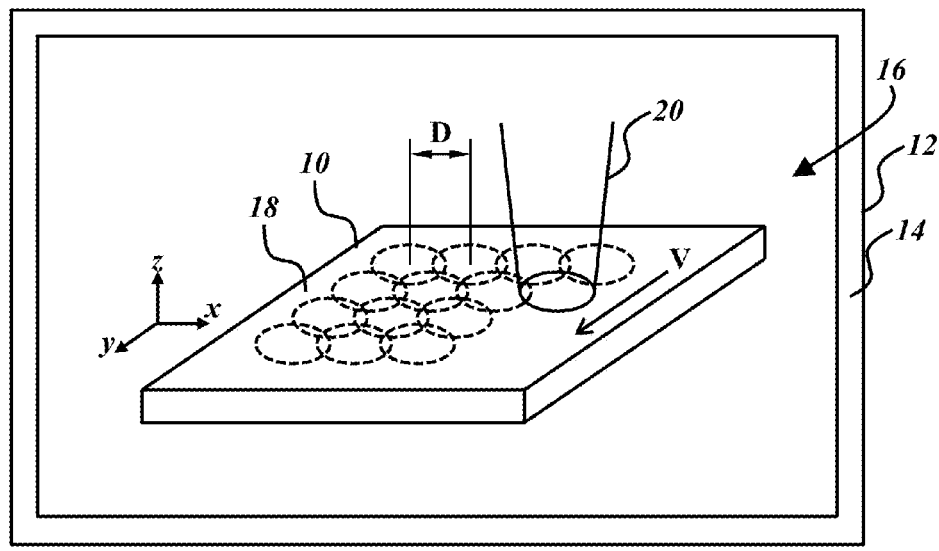
FIG. 1 is a schematic illustration of one example of a laser process that combines laser ablation and laser CVD.

An exemplary surface modification process is illustrated schematically in FIG. 1 being performed on a substrate 10. The particularly illustrated process is a combined laser ablation and laser CVD process. The illustrated process is performed in a CVD chamber 12 comprising a housing 14 and an internal volume 16. Though not shown explicitly, other CVD chamber features may of course be included, such as inlet and exhaust ports for introducing precursor gases and removing reaction gases and/or heat from the internal volume 16 of the chamber 12, process monitoring devices, etc. During the process, the internal volume 16 of the chamber 12 includes a mixture of one or more substances in vapor form, with the substances selected to include at least one constituent of the desired coating to be deposited on the substrate 10. Substances of the gaseous mixture may be elemental (e.g. nitrogen, oxygen, etc.) or in the form of compounds (e.g. $CO_2$, $CH_4$, etc.) and selected to react with the material of the substrate 10 at certain conditions and in proper stoichiometric amounts to arrive at the desired coating composition. CVD processes are generally well-known, and the details of the reactive environment are thus not described in further detail here.

In conventional CVD processes, the entire substrate 10 is typically heated to drive the deposition reaction at a substrate surface 18. In the process of FIG. 1, the energy that drives the deposition reaction is provided by a laser light beam 20 (also referred to herein as the laser) directed at the surface 18 of the substrate 10 from a laser light source (not shown). In this case, the laser 20 is also configured to perform laser ablation. Generally, laser ablation is any process that uses focused laser light to vaporize substrate material. At one extreme, laser ablation can be configured to deliver continuous large amounts of focused energy sufficient to weld or cut through metal substrates. At another extreme, laser ablation can be configured to deliver laser energy in high-frequency, short duration, and/or low energy (e.g. microjoule) pulses. Low-energy laser pulses are preferred in this case, as described further below.

In the process of FIG. 1, the dashed overlapping regions indicate locations already processed—i.e., where the laser 20 has already impinged the substrate surface 18. A laser motion mechanism or scanner (not shown) moves the laser in the x- and y-directions. The illustrated laser 20 is moving in the y-direction at a velocity V. The spacing D between the processing spots is a function of pulse frequency and the velocity V. Nanosecond, picosecond, or femtosecond lasers may be used for ablation. These terms refer generally to the scale of the duration of individual laser pulses, and shorter pulse durations are typically associated with higher pulse frequencies. It has been found that such ultra-short pulse lasers can be configured to produce micron-scale raised features on the processed substrate. While the exact mechanism is not fully understood, it is believed that material is removed and redeposited in the same location (within the cross-section of the laser beam). Certain characteristics of the process (e.g., forces due to rapid localized pressure changes at the laser spot, non-uniform energy distribution across the width of the laser beam, and/or surface non-uniformity initiated by partially overlapped laser spots) cause some of the ablated and redeposited material to form raised features at the substrate surface. Examples of laser ablation processes and parameters suitable for formation of raised features are available in a publication entitled "Characterization of Individual Microneedles Formed on Alloy Surfaces by Femtosecond Laser Ablation" (*Metallurgical and Materials Transactions A*, vol. 43A, pp. 2574-2580 (August 2012)), which is incorporated herein by reference.

Figure 2:
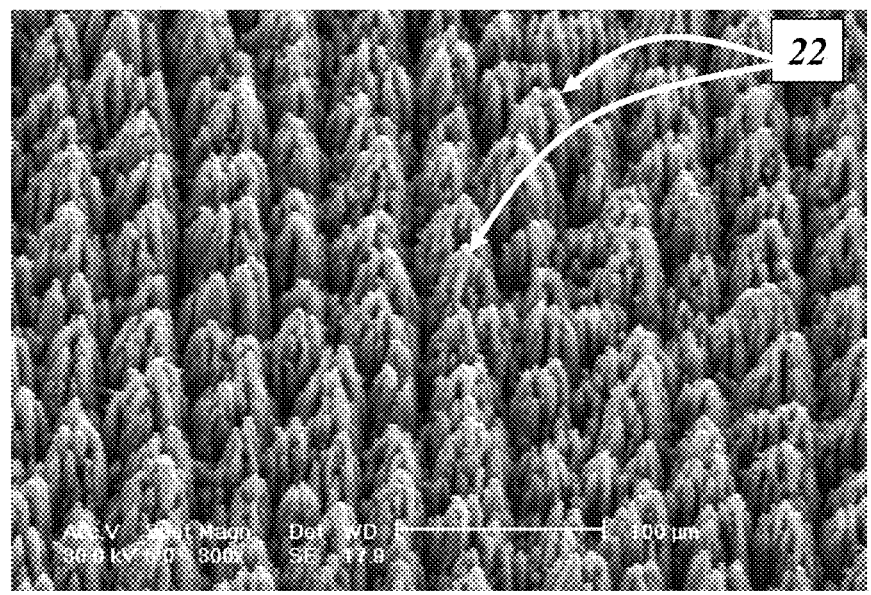
FIG. 2 is a scanning electron microscope (SEM) micrograph of an aluminum alloy substrate after being subjected to the process of FIG. 1 in a nitrogen atmosphere.

FIG. 2 is a scanning electron microscope (SEM) micrograph of a substrate surface processed by the illustrative method of FIG. 1. After being subjected to the process, the substrate 10 includes a relatively uniform array of raised features 22 extending in the direction from which the laser was directed at the substrate. These raised features 22 may be referred to as microneedles. Each individual microneedle 22 has an overall shape similar to a needle, with a generally cylindrical base tapering to a point or apex. In this particular example, the substrate material is an aluminum alloy, Al5754. A femtosecond laser was used with a pulse frequency of 1000 kHz, a pulse energy of 7 µJ, and a scanning speed (velocity, V) of 120 mm/sec. The process was performed in a controlled atmosphere consisting essentially of nitrogen to produce aluminum nitride (AlN).

Figure 3:
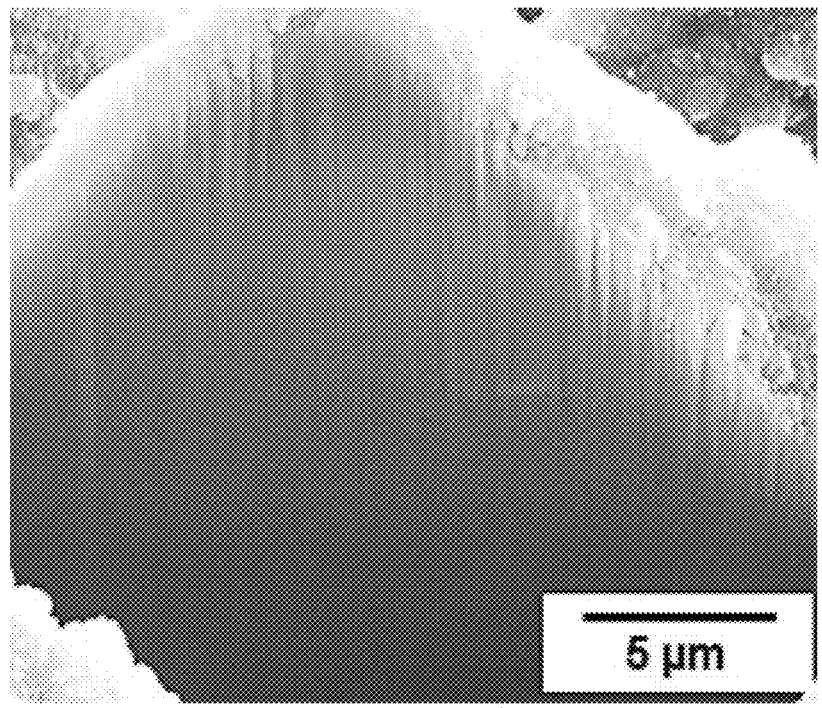
FIGS. 3 and 4 are SEM micrographs of individual microneedles formed by laser ablation.
Figure 4:
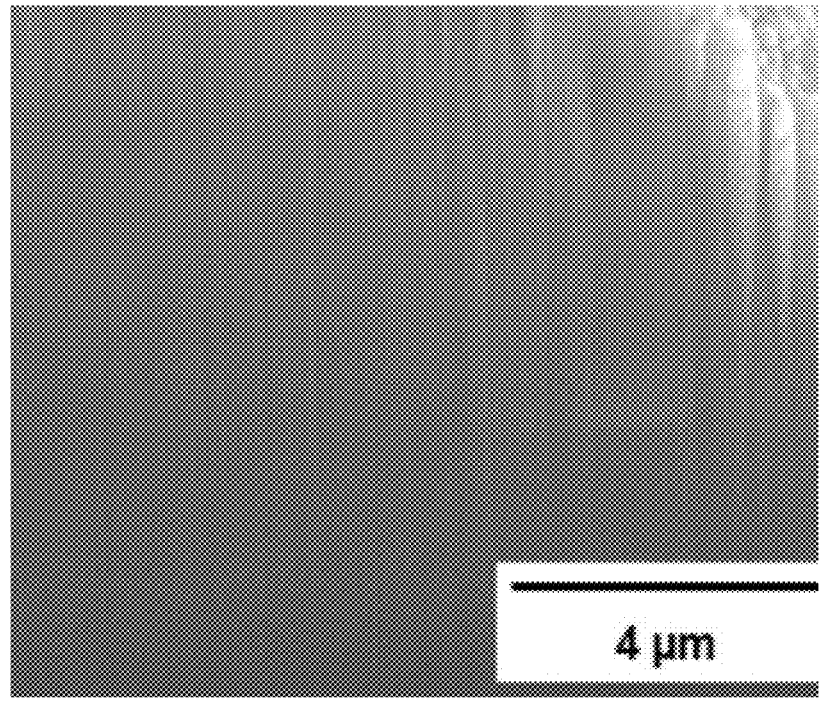

FIGS. 3 and 4 are SEM micrographs of a cross-section of an individual microneedle formed on an aluminum alloy (Al5754) substrate surface by a femtosecond laser in an air environment. The average height of the individual microneedles of the array was measured as 30-40 µm, and the average tip radius was measured 10-15 µm. As shown in FIGS. 3 and 4, an individual microneedle includes a plurality of fine columnar dendrites, each of which is about 100 nm in width or diameter.

Figure 5:
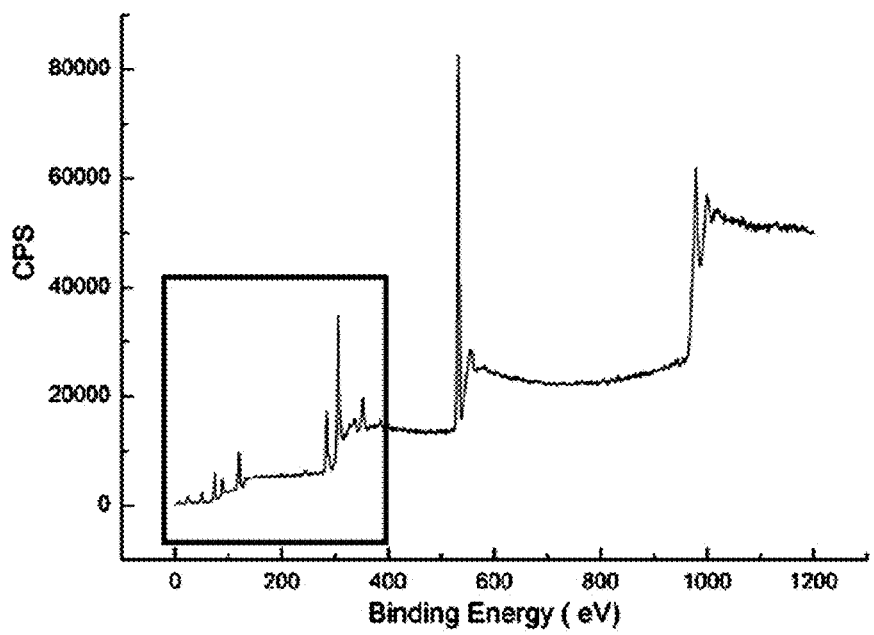
FIG. 5 is an X-ray Photoelectron Spectroscopy (XPS) spectrograph of the processed substrate of FIG. 2.
Figure 6:
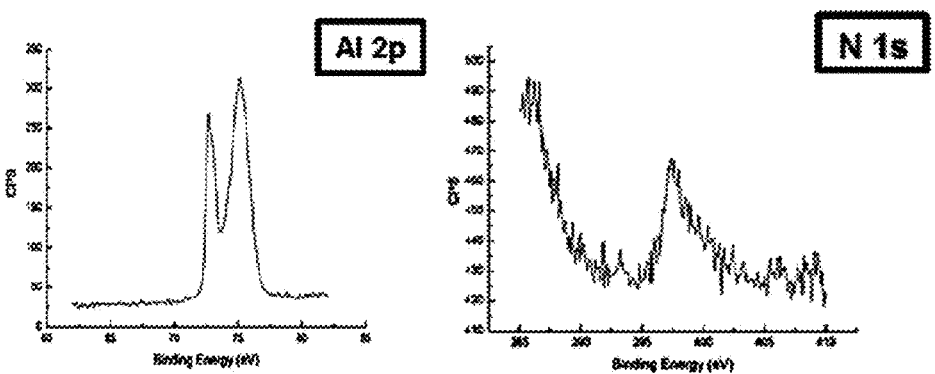
FIG. 6 includes enlarged views of the Al and N portions of the spectrograph of FIG. 5.

FIG. 5 is an XPS spectrograph of the Al5754 substrate with microneedles produced in a nitrogen atmosphere according to FIGS. 1 and 2. The marked region of the spectrograph was analyzed, and the plots of FIG. 6 show the presence of Al and N in the specimens, indicating the successful combination of laser ablation and laser CVD. TABLE I below compares the binding energy of AlN in the sample of FIG. 2, produced by the process of FIG. 1, with other reported values for conventionally produced aluminum nitride. TABLE I indicates similar values for binding energy for AlN produced by the above-described method and for conventionally produced AlN, indicating a strong bond between the substrate and the nitrogen.

TABLE I

|  | Element | |
| --- | --- | --- |
|  | Al | N |
| Energy Level | 2p | 1s |
| Binding Energy (NIST) eV | 73.90, 74.40 | 397.30 |
| Binding Energy (Experiment) eV | 72.7, 75.1 | 397.30 |
| Binding Energy (Literature) eV | 73.5 ± 0.3 | 396.4 ± 0.3 |

The process is not limited to these examples of substrate material and CVD atmosphere and can be carried out on nearly any substrate, with the composition of the CVD atmosphere limited only by typical CVD limitations, though laser CVD may be able to produce some coatings not possible with conventional CVD, and unable to produce others. A substrate comprising aluminum was used in this example to demonstrate applicability of the process to aluminum or aluminum alloy substrates, which are commonly used as the current collector or electrode substrate on the positive electrode of a Li-ion battery.

Figure 7:
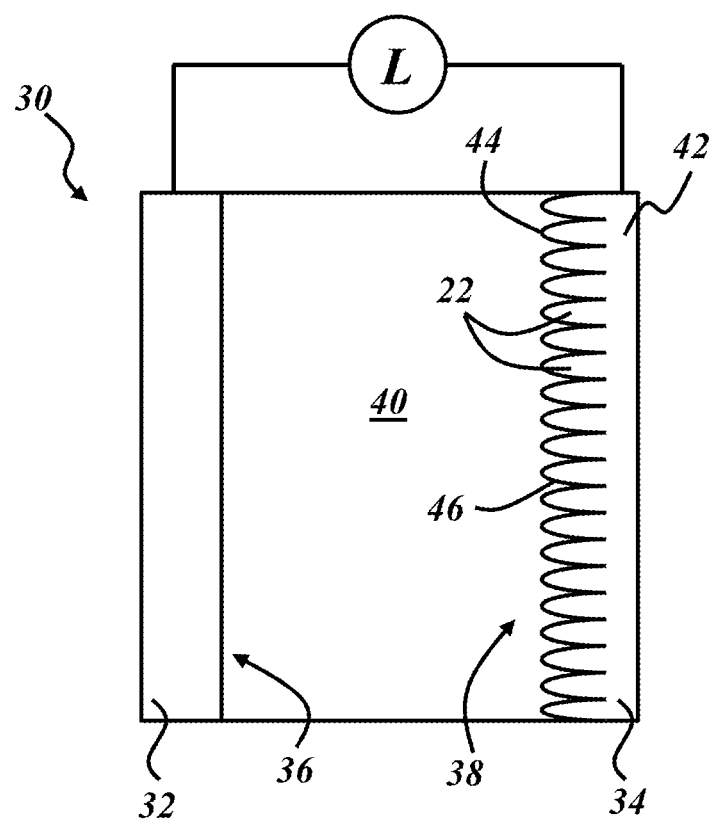
FIG. 7 is a schematic illustration of an example of an electrochemical cell with an electrode having microneedles.

FIG. 7 schematically illustrates an exemplary electrochemical cell 30, such as a battery cell. The electrochemical cell 30 includes a first (negative) electrode 32 and a second (positive) electrode 34. The electrodes 32, 34 have respective opposing faces 36, 38 with an electrolyte 40 therebetween. One or both of the electrodes 32, 34 includes the above-described microneedles 22 that extend toward the other of the electrodes. During a discharge cycle, electrons flow from the negative electrode 32 to the positive electrode 34 through an applied electrical load L, and chemical changes occur at the electrode faces 36, 38 that electrically balance the cell. During a charge cycle, an electrical potential is applied across the electrodes and electrons flow in the opposite direction, reversing the chemical changes that occurred during discharge.

In this example, the microneedles 22 are illustrated as part of the positive electrode 34 and are shown in exaggerated form in cross-section for purposes of illustration. The illustrated second electrode 34 includes a base 42 formed from a substrate material, and the microneedles 22 extend from the base and generally toward the first electrode 32 to a microneedle tips 44. The microneedles 22 comprise an active metal compound available at microneedle surfaces 46 in an amount that changes during charge and discharge cycles of the electrochemical cell 30. The microneedles 22 may also include the substrate material. The substrate material and the active metal compound may be arranged in the microneedles 22 in a variety of ways and may be controlled during the laser processes described above, when so produced.

For instance, each microneedle 22 may include a relatively homogeneous mixture of substrate material and active metal compound. This may be the case where a combined ablation and CVD process (e.g., FIG. 1) is used and where the controlled atmosphere includes the desired precursor vapors for the entire duration—from nucleation through growth—of microneedle formation. In another example, the substrate material is the active metal compound. This may be the case where an electrode is processed in an inert environment with the intent to form microneedles on the electrode, such as to increase active surface area. In another example, each microneedle includes a core substrate material with an outer coating of active metal compound. This may be the case when the desired gaseous mixture of precursor substances is introduced to the CVD chamber only near the end of microneedle formation. This may also be the case when the microneedles are formed in a first process and subsequently coated in a second process. The second process may be laser CVD, conventional CVD, PVD, or other suitable process.

In the particular example of a Li-ion cell, the active metal compound is a lithium-containing compound as part of the positive electrode 34, and the amount of the lithium-containing compound decreases during charge cycles and increases during discharge cycles. Some of the various types of Li-containing compounds suitable for use in Li-ion cells include $LiNi_xMn_yCo_zO_2$ (lithium nickel manganese cobalt oxide, or NMC), $LiMn_2O_4$ (lithium manganese oxide, or LMO), and $LiFePO_4$ (lithium iron phosphate, or LFP). Other lithium compounds capable of reversibly donating lithium ions to the negative electrode 32 may be developed. In one embodiment, the substrate material is aluminum or an aluminum alloy. Aluminum foils are commonly used in Li-ion positive electrodes as current collectors. The aluminum may be alloyed with elements specifically tailored to participate in the CVD process by either becoming part of the active metal compound, or by reacting with a substance in the controlled environment of the CVD chamber to produce the desired active metal compound and becoming part of an unused reaction product.

An electrochemical cell 30 that includes an electrode having microneedles may have an increased energy density compared to those with conventional electrodes. The energy density of a battery is the amount of energy it stores per unit mass. The microneedles can provide increased energy density by providing increased active surface area on the electrode(s) and effectively increasing the amount of active metal compound available from the electrode. For instance, a portion of the electrode having microneedles may be characterized by a facial area—i.e., the projected area (length×width) of that portion. Without microneedles, the actual surface area of that portion of the electrode is essentially the same as the facial area. With microneedles, however, the actual surface area may be in a range from 10-50% greater than the facial area, or even higher. The embodiment of FIG. 2 has a surface area about 30% greater than the facial area of the same portion.

One embodiment of the above-described method for modifying a substrate surface with a laser is a method of making the electrode for use in the electrochemical cell and includes the steps of: (a) providing an electrode substrate formed from the substrate material; (b) forming raised surface features on the electrode substrate using a pulsed laser; and (c) depositing the active metal compound along the raised surface features. The laser is configured to be delivered with a pulse energy and duration sufficient to cause material to be removed and redeposited at the same location to form the raised surface features, which include the substrate material.

As noted above, the step of depositing the active metal compound is not limited to laser CVD, or even to conventional CVD, as the formed electrode will benefit from the raised surface features, such as microneedles, whether or not the active metal compound is formed simultaneously with the raised surface features. It is also the case that certain types of electrodes will benefit from a laser CVD process for active metal compound deposition, even without microneedles. For instance, with Li-ion batteries, the CVD process eliminates loose particles of material that typically result from other conventional coating processes such as a slurry coating process. A laser CVD process in particular comes with the additional advantage of process speed, as the kinetics of the CVD reaction are up to 10,000 times faster with laser-provided energy compared to thermal energy from an entire substrate being heated. By way of example, a laser CVD process can produce a titanium nitride coating in a matter of seconds, while other CVD processes require about 8 hours to produce the same coating. In some embodiments, the CVD process may be a hybrid process in which the laser energy supplements other thermal energy sources.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of making an electrode for use in an electrochemical cell, comprising the steps of:
   (a) providing an electrode substrate formed from a substrate material;
   (b) forming raised surface features comprising the substrate material on the electrode substrate using a pulsed laser to deliver a plurality of laser pulses to the electrode substrate, each laser pulse having a pulse energy and duration sufficient to form the raised surface features; and (c) depositing a metal compound along the raised surface features, wherein the metal compound is selected to be an active metal compound that changes in amount during charge and discharge cycles when in use in the electrochemical cell, wherein step (c) comprises a laser chemical vapor deposition (CVD) process performed in a controlled atmosphere including at least one element of the deposited metal compound in vapor form, and wherein at least some of the reaction energy of the CVD process is provided by laser light.

2. The method of claim 1, wherein the laser light is provided by the pulsed laser of step (b) so that steps (b) and (c) are performed simultaneously.

3. The method of claim 1, wherein the substrate material comprises aluminum and the controlled atmosphere comprises a mixture of gases that reacts with the substrate material to form a lithium-containing compound as the deposited metal compound to form a discharged positive electrode for use in a lithium-ion battery.

4. The method of claim 1, wherein step (b) comprises laser ablation, and the pulsed laser simultaneously ablates some of the substrate material at a substrate surface and sufficiently heats the substrate material to react with the controlled atmosphere to form the metal compound as a solid reaction product that is deposited over the substrate along the raised surface features.

5. The method of claim 1, wherein the pulse duration is on a nanosecond, picosecond, femtosecond, or shorter time scale.

6. The method of claim 1, wherein said raised surface features comprise microneedles each having a microneedle surface extending between a base and a microneedle tip.

7. The method of claim 6, wherein the microneedles comprise the active metal compound, and the active metal compound is available at the microneedle surfaces.

8. The method of claim 6, wherein the microneedles comprise the substrate material.

9. The method of claim 6, wherein each microneedle comprises a plurality of dendrites extending in the same direction as the microneedle and having a diameter smaller than a diameter of the microneedle.

10. The method of claim 1, wherein the amount of the active metal compound decreases during charge cycles and increases during discharge cycles.

11. The method of claim 1, wherein the substrate material comprises aluminum.

12. The method of claim 1, wherein a portion of the electrode comprising at least some of the raised surface features has a facial area and a surface area, the surface area being greater than the facial area by 10 percent or more.

13. A method comprising laser ablation and laser chemical vapor deposition, wherein the same laser simultaneously ablates substrate material at a substrate surface of a substrate and sufficiently heats the substrate material to react with one or more gaseous substances in a controlled environment to form a solid reaction product that is deposited over the substrate.

14. The method of claim 13, wherein the laser is a pulsed laser with a pulse duration on a nanosecond, picosecond, femtosecond, or shorter time scale.

15. The method of claim 13, wherein the substrate material comprises aluminum.

16. The method of claim 13, wherein at least some of the solid reaction product is deposited over the substrate in the form of raised surface features.

17. The method of claim 13, wherein at least some of the solid reaction product is deposited over the substrate in the form of microneedles.

18. The method of claim 17, wherein each microneedle comprises a plurality of dendrites extending in the same direction as the microneedle and having a diameter smaller than a diameter of the microneedle.

19. The method of claim 13, wherein the method comprises forming raised surface features over the substrate, a portion of the substrate having at least some of the raised surface features having a surface area that is greater than a surface area of said portion by 10 percent or more.

20. The method of claim 13, wherein the laser is a pulsed laser.

* * * * *